(12) United States Patent
Lee et al.

(10) Patent No.: US 9,313,439 B2
(45) Date of Patent: Apr. 12, 2016

(54) USER ADAPTIVE DISPLAY DEVICE AND METHOD THEREOF

(75) Inventors: Juhwan Lee, Seoul (KR); Kisu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 368 days.

(21) Appl. No.: 13/058,768

(22) PCT Filed: Aug. 24, 2010

(86) PCT No.: PCT/KR2010/005644
§ 371 (c)(1),
(2), (4) Date: Feb. 11, 2011

(87) PCT Pub. No.: WO2011/065653
PCT Pub. Date: Jun. 3, 2011

(65) Prior Publication Data
US 2011/0254846 A1    Oct. 20, 2011

(30) Foreign Application Priority Data

Nov. 25, 2009  (KR) .......................... 10-2009-0114546

(51) Int. Cl.
*G06T 15/00* (2011.01)
*G06T 15/20* (2011.01)
*G09G 5/00* (2006.01)
*H04N 5/44* (2011.01)
*G06F 3/01* (2006.01)
*G06F 3/03* (2006.01)
*H04N 21/422* (2011.01)
*H04N 21/4223* (2011.01)
(Continued)

(52) U.S. Cl.
CPC .............. *H04N 5/4403* (2013.01); *G06F 3/011* (2013.01); *G06F 3/0304* (2013.01); *H04N 21/4223* (2013.01); *H04N 21/42203* (2013.01); *H04N 21/439* (2013.01); *H04N 21/44* (2013.01); *H04N 21/4415* (2013.01); *H04N 21/44218* (2013.01); *H04N 21/4532* (2013.01); *H04N 21/816* (2013.01); *G06T 15/00* (2013.01); *G06T 15/20* (2013.01); *G09G 5/00* (2013.01); *H04N 21/4402* (2013.01); *H04N 21/440263* (2013.01)

(58) Field of Classification Search
USPC .......................................................... 345/581
See application file for complete search history.

(56) References Cited

U.S. PATENT DOCUMENTS 8,269,817 B2 *  9/2012  Kumar et al. ............... 348/14.11
2003/0001908 A1 *  1/2003  Cohen-solal ................. 345/863
(Continued)

FOREIGN PATENT DOCUMENTS

JP    2008-42466 A     2/2008
JP    2008-268327 A    11/2008
(Continued)

*Primary Examiner* — Mark Zimmerman
*Assistant Examiner* — Sohum Kaji
(74) *Attorney, Agent, or Firm* — Birch, Stewart, Kolasch & Birch, LLP (57) ABSTRACT

Provided are a user adaptive display device and method thereof. The user adaptive display device includes a plurality of display modules that are jointly or individually controllable and adjacent to each other. The user adaptive display device includes a communication unit, a control unit, and a display unit. The communication unit receives data on user information. The control unit analyzes the user information and changes an image configuration according to the user information. The display unit displays an image with the image configuration changed by the control unit.

11 Claims, 10 Drawing Sheets

(51) Int. Cl.
*H04N 21/439* (2011.01)
*H04N 21/44* (2011.01)
*H04N 21/4415* (2011.01)
*H04N 21/442* (2011.01)
*H04N 21/45* (2011.01)
*H04N 21/81* (2011.01)
*H04N 21/4402* (2011.01)

(56) References Cited

U.S. PATENT DOCUMENTS

| | | | |
|---|---|---|---|
| 2004/0194128 A1* | 9/2004 | McIntyre et al. | 725/32 |
| 2004/0246272 A1* | 12/2004 | Ramian | 345/660 |
| 2007/0225904 A1* | 9/2007 | Pantalone et al. | 701/207 |
| 2008/0046947 A1* | 2/2008 | Katznelson | 725/114 |
| 2008/0114476 A1* | 5/2008 | Kay et al. | 700/90 |
| 2008/0189173 A1 | 8/2008 | Bakar et al. | |
| 2009/0237562 A1 | 9/2009 | Fujiwara et al. | |
| 2010/0060722 A1* | 3/2010 | Bell | 348/51 |

FOREIGN PATENT DOCUMENTS

| | | |
|---|---|---|
| JP | 2009-225215 A | 10/2009 |
| KR | 10-2006-0063454 A | 6/2006 |
| KR | 10-2006-0134309 A | 12/2006 |
| KR | 10-2007-0059107 A | 6/2007 |

* cited by examiner

USER ADAPTIVE DISPLAY DEVICE AND METHOD THEREOF

CROSS-REFERENCE TO RELATED APPLICATIONS

The present application claims priority under 35 U.S.C. 119 and 35 U.S.C. 365 to Korean Patent Application No. 10-2009-0114546 (filed on 25 Nov. 2009), which is hereby incorporated by reference in its entirety.

BACKGROUND

The present disclosure relates to a user adaptive display device and method thereof, and more particularly, to a user adaptive display device and method thereof, in which the image quality is adjusted according to the location of a user.

When a user feels inconvenience in watching TV or viewing a PC monitor due to an excessively large or small size of images or texts on its screen, the user directly has to adjust the size of images or the font of texts.

SUMMARY

Embodiments provide a user adaptive display device and method thereof, in which the display image quality can be automatically adjusted according to corresponding user information that include the location, voice, and gesture of a user.

In one embodiment, a user adaptive display device including a plurality of display modules that are jointly or individually controllable and adjacent to each other includes: a communication unit receiving data on user information; a control unit analyzing the user information and changing an image configuration according to the user information; and a display unit displaying an image with the image configuration changed by the control unit.

The user information may include information on a distance from a user, and the control unit may changes the image configuration according to the distance from the user.

The control unit may change the size of the'image or the size of texts included in the image, or may perform conversion between a three-dimensional image and a two-dimensional image, according to the distance from the user.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Hereinafter, exemplary embodiments will be described in detail with reference to the accompanying drawings.

Figure 1:
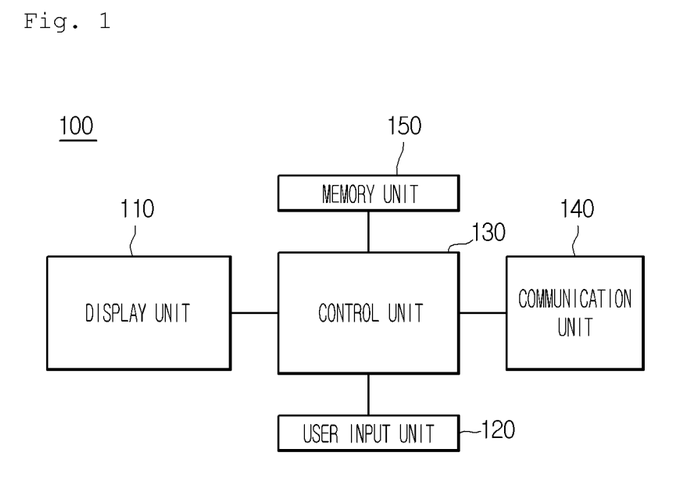
FIG. 1 is a schematic view illustrating the configuration of a user adaptive display device according to an embodiment.

FIG. 1 is a schematic view illustrating the configuration of a user adaptive display device according to an embodiment.

Referring to FIG. 1, a display device 100 may adjust the configuration of a displayed image using the distance from a user and the age of the user. That is, the image configuration may be adjusted by changing the size of a displayed text, changing the size of a display screen, and performing conversion between two-dimensional and three-dimensional images.

The display device 100 may include a display unit 110 on which an image is displayed, a user input unit 120 receiving commands for operating the display device 100 or configuring the image, a control unit 130, and a communication unit 140 receiving user information.

Since the display unit 110 can be installed on the surface of a wall in an installation space of the display device 100, the display unit 110 may occupy all or a portion of the surface of the wall.

For example, the display device 100 may be installed on one or more side walls of a living room or family room, and the display unit 110 may be installed on all or a portion of the side walls of the living room or family room.

Accordingly, the display device 100 may also be called a display wall or a video wall, but will be described herein as the display device 100.

The display unit 110 may be one large-scale screen that is constituted by a plurality of sub display modules having a tile shape.

Figure 2:
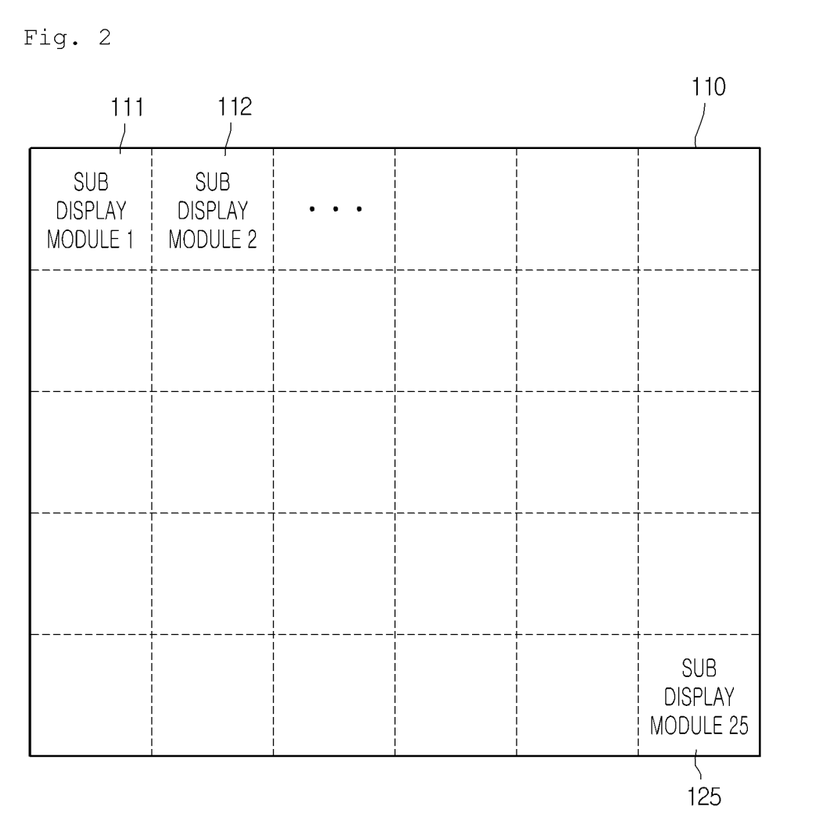
FIG. 2 is a view illustrating a display unit of a user adaptive display device according to an embodiment.

For example, as shown in FIG. 2, a plurality of sub display modules 111 to 125 may be connected to form one large-scale display unit 110 and output a single image. That is, the plurality of sub display modules 111 to 125 constituting the display unit 110 may be jointly or individually controlled.

In one embodiment, the plurality of sub display modules 111 to 125 of the display unit 110 may operate as individual display modules, respectively. Accordingly, the plurality of sub display modules 111 to 125 may output individual images, respectively.

In one embodiment, the display unit 110 of the display device 110 may be configured with a projector for projecting images on a wall surface. In this case, light including image information from the projector may be projected on the wall surface.

Thus, the display device 100 may occupy all or a portion of the wall surface, and may provide single or multiple images to a user.

The display unit 110 may display a certain image or video, for example, certain contents received through the communication unit 140. Such contents may include still images or videos that include two-dimensional or three-dimensional images.

The communication unit 140 of the display device 100 may receive contents from an external server or other display devices through wired or wireless networks, and may display the received contents on the display unit 110. Here, the contents may include various applications, as well as broadcasting signals.

The display device 100 may store contents in a memory unit 150. The control unit 130 may read the contents stored in the memory unit 150, and may display the read contents on the display unit 110.

Also, various contents including audiovisual materials to be displayed and various user information may be received through the communication unit 140. Here, the user information may refer to the face, age, gesture and voice of a user, the distance from the user, and the location of the user, which can be construed as information on the user near the display unit 110.

In order to obtain the user information, the display unit 110 may be provided with a camera that can photograph a user, and a microphone that can receive a voice of the user. Units for obtaining the user information may be called recognition devices.

Figure 3:
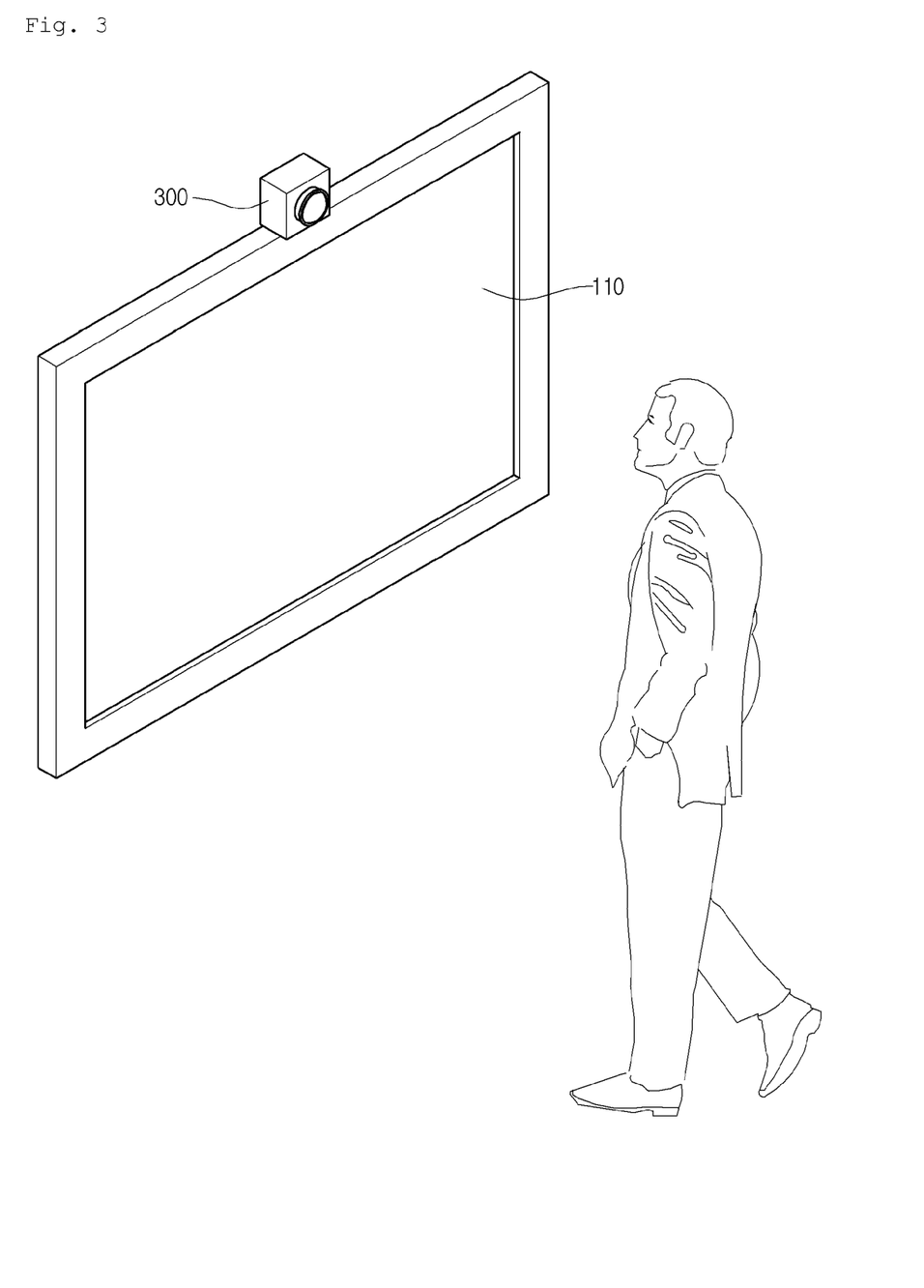
FIG. 3 is a view illustrating an exemplary display unit according to an embodiment.

FIG. 3 illustrates the display unit 110 installed on a wall and a user viewing the display unit 110. A recognition device 300 may be provided in the display unit 110 to obtain user recognition information from the user.

The recognition device 300, which is a unit for obtaining the user information, may include a camera for recognizing the face or gesture of a user, and a microphone for receiving the voice of the user.

The user information such as image or sound that is obtained by the recognition device 300 may be delivered to the communication unit 140. To this end the recognition device 300 may be wired or wirelessly connected to the communication unit 140. In another embodiment, the user information that is obtained by the recognition device 300 may be delivered to an external server, and the corresponding user information from the external server may be redelivered to the communication unit 140.

By using the information obtained by the recognition device 300, the display device 100 may configure images (including still images or videos and menu screen or texts) that are displayed. The configuration of the images may include various settings such as changing the size of the images, changing the size of the texts, or determining a sub display module on which the images are to be displayed, according to the user information.

The user information may include the present or absence of a user, the face, location, gesture and voice of the user, and the distance from the user. The control unit 130 may recognize and analyze the user information, and may configure the images according to the analyzed user information. To this end, the control unit 130 may include or use various modules or applications for data-processing such as the recognition of the user information and the analysis of the user information.

Figure 12:
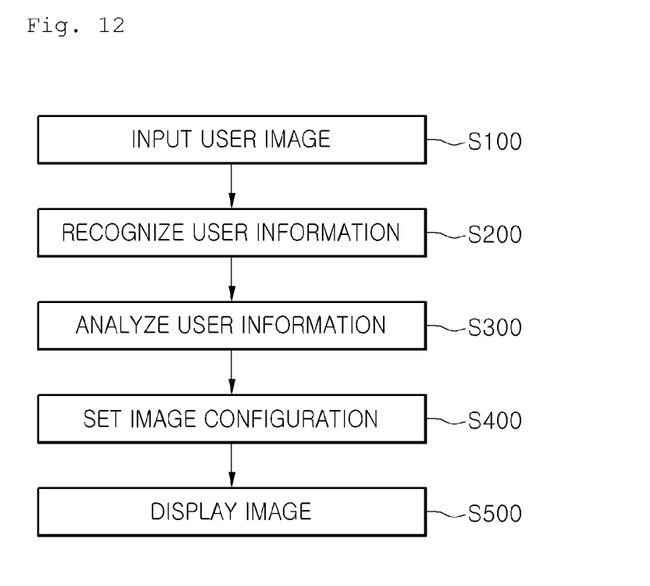
FIG. 12 is a flowchart illustrating a method of displaying a display device according to an embodiment.

The recognition and analysis of the user information performed by the control unit 130 are briefly described in the flowchart of FIG. 12.

Hereinafter, the recognition and analysis of the user information by control unit 130, and the configuration of the images using the recognition and analysis of the user information will be described in detail.

In operation S100, the control unit 130 may receive data such as user images or user voices through the communication unit 140. In operation S200, the recognition of the user information may be performed using the received data.

That is, the control unit 130 may receive data including the user image (still images or videos) and the user voices that are received from the communication unit 140, and may perform the recognition of the face, voice and gesture of a user using the received data.

The user's face recognition may include extracting a face region of a user from image data obtained by a camera 310 of the recognition device 300, and utilizing the data of the extracted face region as user information.

The user's voice recognition may include removing ambient noises from voice data obtained by a microphone of the recognition device 300, extracting voice data of about 87 Hz to about 1.2 KHz corresponding to the voice frequency band of a user, and utilizing the extracted voice data as user information.

The user's gesture recognition may include extracting motions or gestures of a user from video data obtained by the camera 310 of the recognition device 300, and utilizing the extracted user's gestures as user information.

The control unit 130 may utilize a distance between a user and the display unit 110 among data delivered from the recognition device 300 as user information. That is, the display device may further include a unit for estimating the location of a user through the camera 310.

In this case, the control unit 130 may require a reference distance for comparison or reference in order to calculate a distance from a user, recognized by the camera 310. For example, a reference image obtained by photographing a user spaced by about 1 meter may be stored in advance, and then the appearance of a user may be recognized from an image photographed by the camera 300. In this case, the control unit 130 may compare the sizes of the user with each other to calculate the distance from the user using a ratio of the sizes of the user. The distance from the user may be calculated by comparing distances between about three or four feature points with each other, instead of the entire sizes of the user. When using the above method, it is possible to calculate the distance from the user (particularly, the face of the user) even when a portion of the body of the user is covered.

To this end, the control unit 130 may calculate the distance from a user, using the face region or size of the user.

On the other hand, instead of calculating the distance from a user using the image of the user photographed by the camera, an infrared light-emitting/receiving device may be further included as a recognition device. In this case, infrared rays emitting from the infrared light-emitting/receiving device may be reflected by an object at the front of the display unit 110, and may return to the infrared light-emitting/receiving device. For example, the distance from the object may be measured according to a method that is called a Time of Flight (TOF) distance measurement method, using the reflection light. The above measurement may be performed on the front side of the display unit 110 to verify the state of the front side of the display unit 110. For example, when a wall is placed at the front side of the display unit 110, the time from the emission of the infrared rays to the reflection of the infrared rays may be uniform. Accordingly, it can be estimated that a user is not located at the front side of the display unit 110. On the other hand, when the time from the emission of the infrared rays to the reflection of the infrared rays may be nonuniform, it can be estimated that a user is located at the front side of the display unit 110. In this case, the monitoring of the presence or absence of a user by the infrared light-emitting/receiving device may be performed at certain intervals of time.

Also, when the camera 310 is an infrared camera, a thermograph method using the infrared camera may be used to determine whether an object is a user. In this case, the temperature distribution may be measured using infrared energy emitting from a user, and then the measurement result may be compared with the distance measurement result measured by the infrared light-emitting/receiving device described above. Thus, it is determined whether the object is a user, by determining the size, shape and temperature of the object.

In operation S300, the control unit 130 may perform an analysis of the recognized user information. In operation S400, the configuration of the image may be performed according to the analyzed user information.

The control unit 130 may performed operations such as estimating the age of a user using the face of the recognized user, indentifying a user using the voice of the user, performing user commands using the gestures of a user, estimating a current posture of a user, and analyzing the distance from a user and the location of the user. However, the term, the user gesture, is not necessarily limited to the motion of the user, and it can also be construed as including the postures (e.g., lying, sitting, and standing postures) of the user who is watching TV.

For example, when the current posture of a user is estimated from an inputted image of the user, information on the user's posture according to the contour and eye's location of the user's face may be stored in memory unit 150. In this case, the control unit 130 may rotate an image displayed on the display unit 110 in the clockwise or counterclockwise direction by about 90 degrees to allow a user to more comfortably look at the image even when the user is lying.

The control unit 130 may estimate the age of a user from the recognized face of the user. In this case, since statistic data on the user's faces according to the age of the users or settings for each user may be stored in the memory unit 150 in advance, the control unit 130 may estimate the age of the user from the recognized face of the user. The estimation of the user's age may be achieved by the voice of the user that is obtained by the microphone of the recognition device. That is, the control unit 130 may estimate the age of a user using voice data of the user that is received. To this end, the memory unit 150 may include a database such as a statistic voice frequency table according to the ages of users.

The control unit 130 may identify user commands according to the user gestures that are recognized. That is, the control unit 130 may analyze whether a user gesture matches an already-stored gesture, and if so, may operate the display unit according to a command preset as a user command. For example, when a user makes a gesture of making a circle by raising his hands over his head, and this gesture of the user matches an already-stored gesture, a display unit power-off signal may be generated as data corresponding thereto.

Thus, data signals corresponding to various user gestures may be stored in the memory unit 150 in advance. Data corresponding to the user gestures may be directly designated by a user. For example, when a lying posture of a user lasts for about 1 hour, this may be set as the display unit power-off signal. In this case, when the control unit 130 determines that the user lies, a timer may be set, and then the control unit 130 may power off the display unit 110 when about one hour passes.

The control unit 130 may performed an analysis of the user situation, and may analyze a method of determining the distance from a user as user information when there are a plurality of users at the front of the display unit 110 and a method of determining the output of images and sounds according to information on noise around a user. For example, when there are a plurality of users in a user image, the control unit 130 may calculate the size of the displayed image using the distances from the respective users, and may allow the image to be displayed in an average size using the calculated result. The control unit 130 may automatically adjust the volume according to the magnitude of the noise around the user.

Also, the control unit 130 may manage a user profile or a user preference, using the user information. For this, the control unit 130 may continuously manage users using the memory unit 150, and the memory unit 150 may include a database in which users are classified according to their faces or voices. That is, a user database may be built and may be continuously managed or updated as the user information including the facial contour, expression, posture, and motion for each user.

The control unit 130 may manage whether there is a modification history in the size of images or texts according to the facial expression, posture, and the ambient environment of a user. For example, when ambient noise is greater than about several tens of decibels (dB), and there is a history in which a user has set the volume of the display unit 110 to level 20, the history may be stored in the user database of the memory unit 150 and may be managed. For example, it may be stored and managed that a user A has watched TV while sitting at a distance of about 1 m from the display unit 110. That is, the control unit 130 may also establish a database including the distances from recognized users and the postures of the recognized users. Such a database may enable the management of TV-watching pattern, i.e., preference of users. For example, when the user A prefers watching television sitting on a sofa spaced from the display unit 110 by about 1 m, the size of image may be displayed in an appropriate size when the user A approaches the display unit.

The TV-watching pattern of a user may be managed by the control unit 130 and the memory unit 150. According to the TV-watching pattern, the size of an image or the size of texts in the image may be automatically adjusted.

The control unit 130 may control images or voices outputted through the display unit 110, using the user information that is analyzed. In operation S500, as described above, the configuration may be performed according to the user information, and the image may be displayed according to the configuration.

Figure 4:
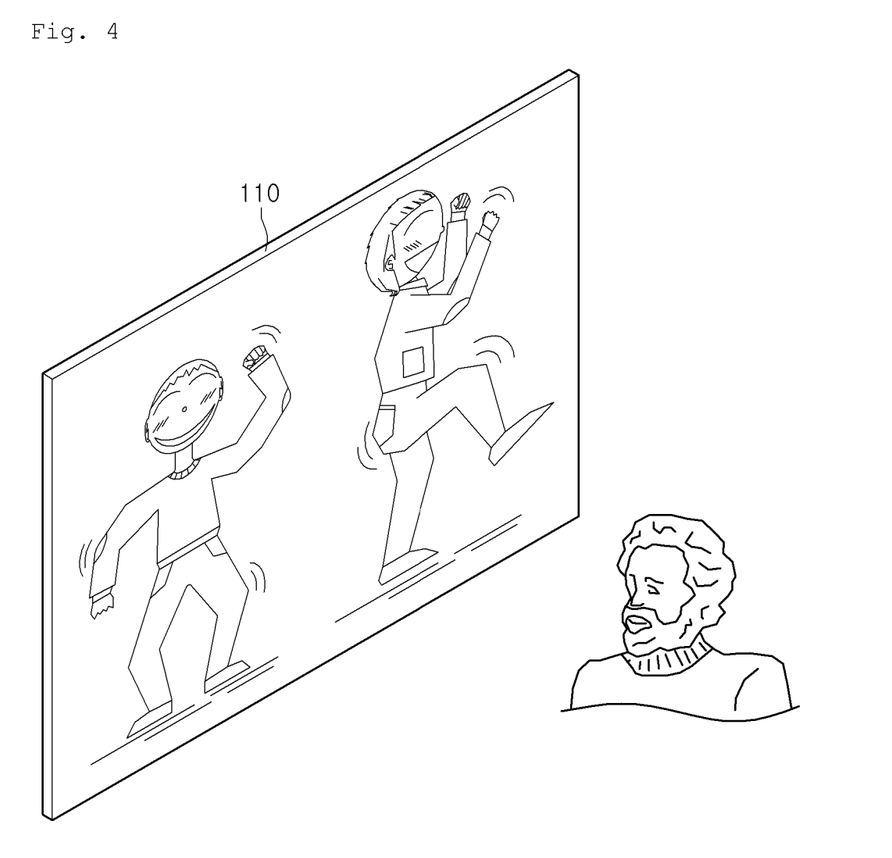
FIGS. 4 and 5 are views illustrating an example of changing an image configuration according to the age of a user.
Figure 5:
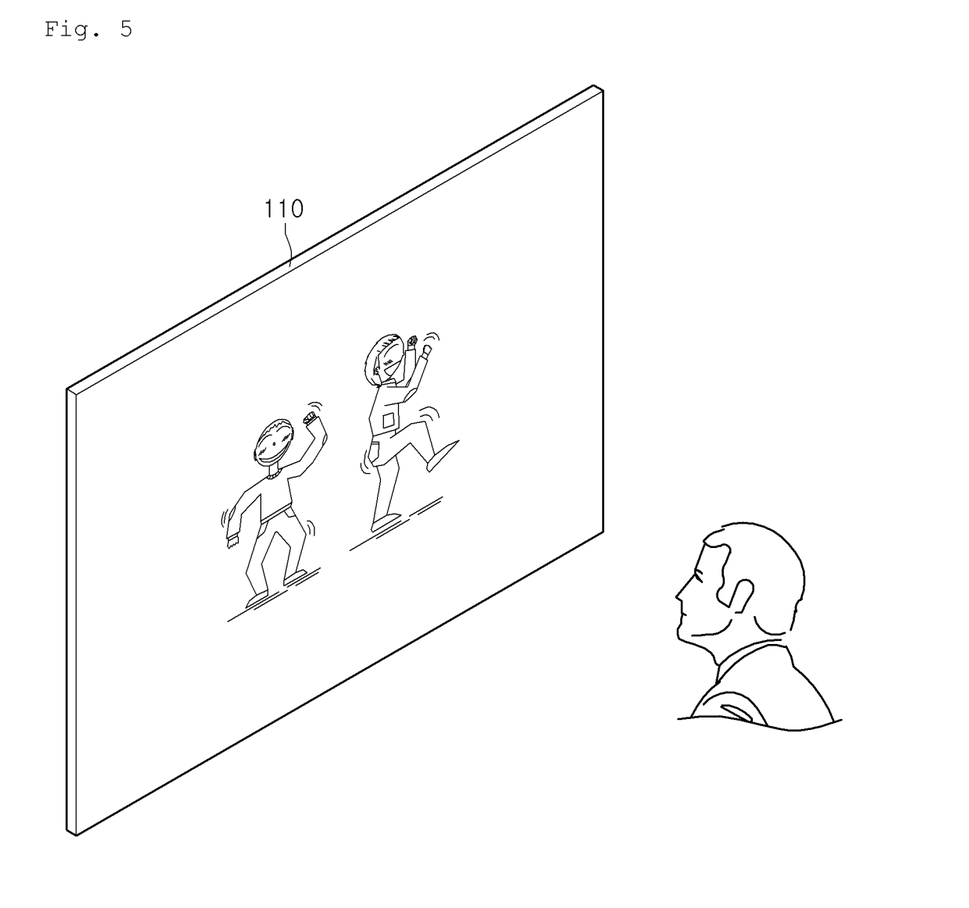

FIGS. 4 and 5 are views illustrating an example of changing an image configuration according to the age of a user When the age of a user is estimated among the user information recognized by the control unit 130, the control unit 130 may perform an image configuration and an image display according to the age of a user.

For example, as described in FIG. 4, when a user that is identified from the face information of the user is of an advanced age, the control unit 130 may operate all of the plurality of sub display modules constituting the display unit 110 to display an image on the whole region of the display. However, when there is another image configuration that is preset by the recognized user, the image may be displayed according to the preset image configuration.

Figure 6:
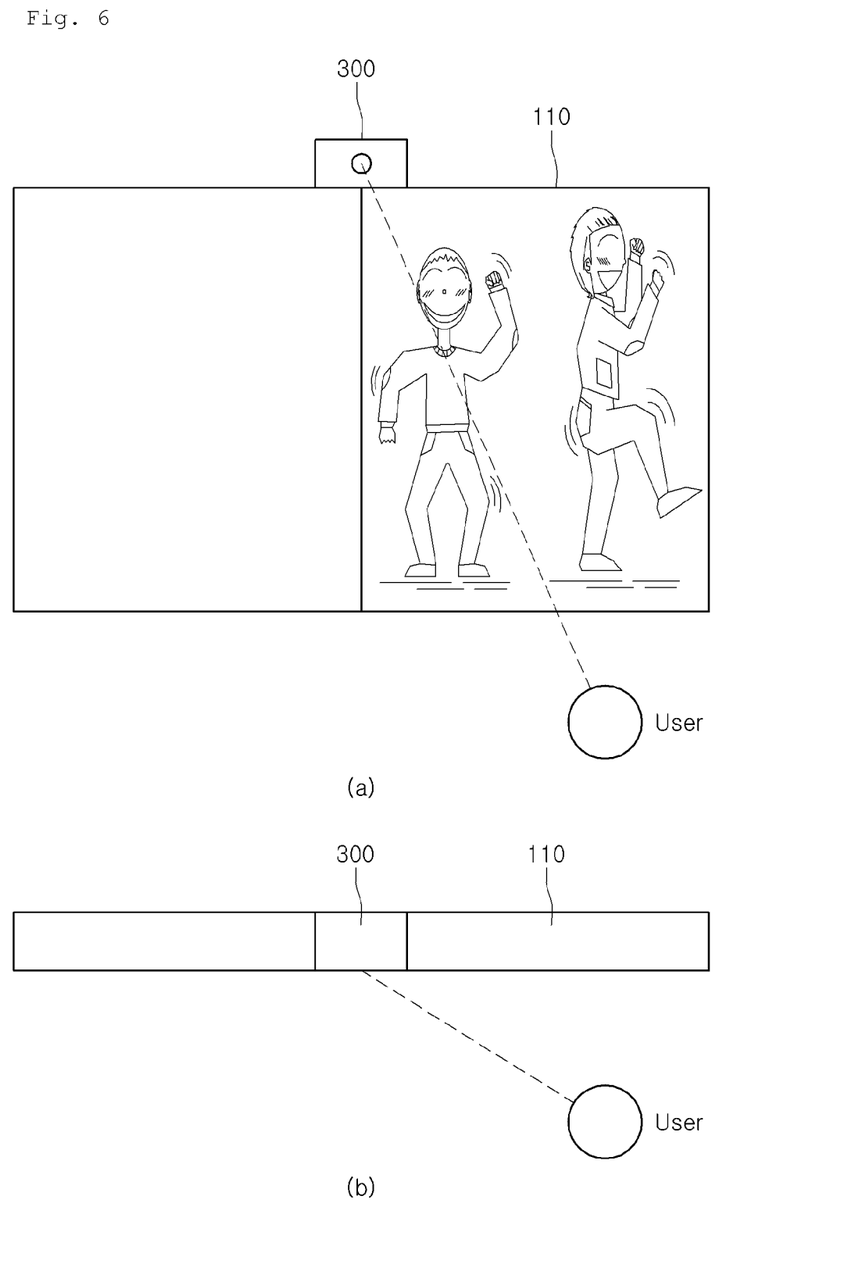
FIG. 6 is a view illustrating an example of changing an image configuration according to the location of a user among user information.

As described in FIG. 5, when a user that is identified from the face information of the user is of a young age, the control unit 130 may operate a portion of the plurality of sub display modules constituting the display unit 110 to display the image in a smaller size. When a portion of the plurality of sub display modules of the display unit 110 operates, only sub display modules corresponding to the location of the user may operate. Thus, the location of user may also be used as the user information. With reference to FIG. 6, the sub display modules that operate may be selected according to the location of a user at the front of the display unit 110. Even in this case, the image may be displayed according to an image configuration if there is a different image configuration from the image configuration that is preset by the recognized user.

FIG. 6 is a view illustrating an example of changing an image configuration according to the location of a user among user information.

As described above, the control unit 130 may extract the user location information from the user image obtained by the recognition device 300 that is provided outside or inside the display device, and may allow the selective operation of the sub display module of the display unit 110 to be performed according to the location of a user.

As described in FIG. 6B, when the control unit 130 determines that a user is located at the right side of the display unit 110, only the sub display located at the front of the user modules may operate among the sub display modules of the display unit 110. However, when the location of a user is frequently changed, the sub display module may also be frequently changed to the degree of making viewing-video to be difficult. Accordingly, when the location of the user is not changed for a certain time, the operation of the sub display modules may also be fixed.

When there is an image configuration that is preset by a recognized user, the control unit 130 may allow an image to be displayed according to the preset image configuration.

Figure 7:
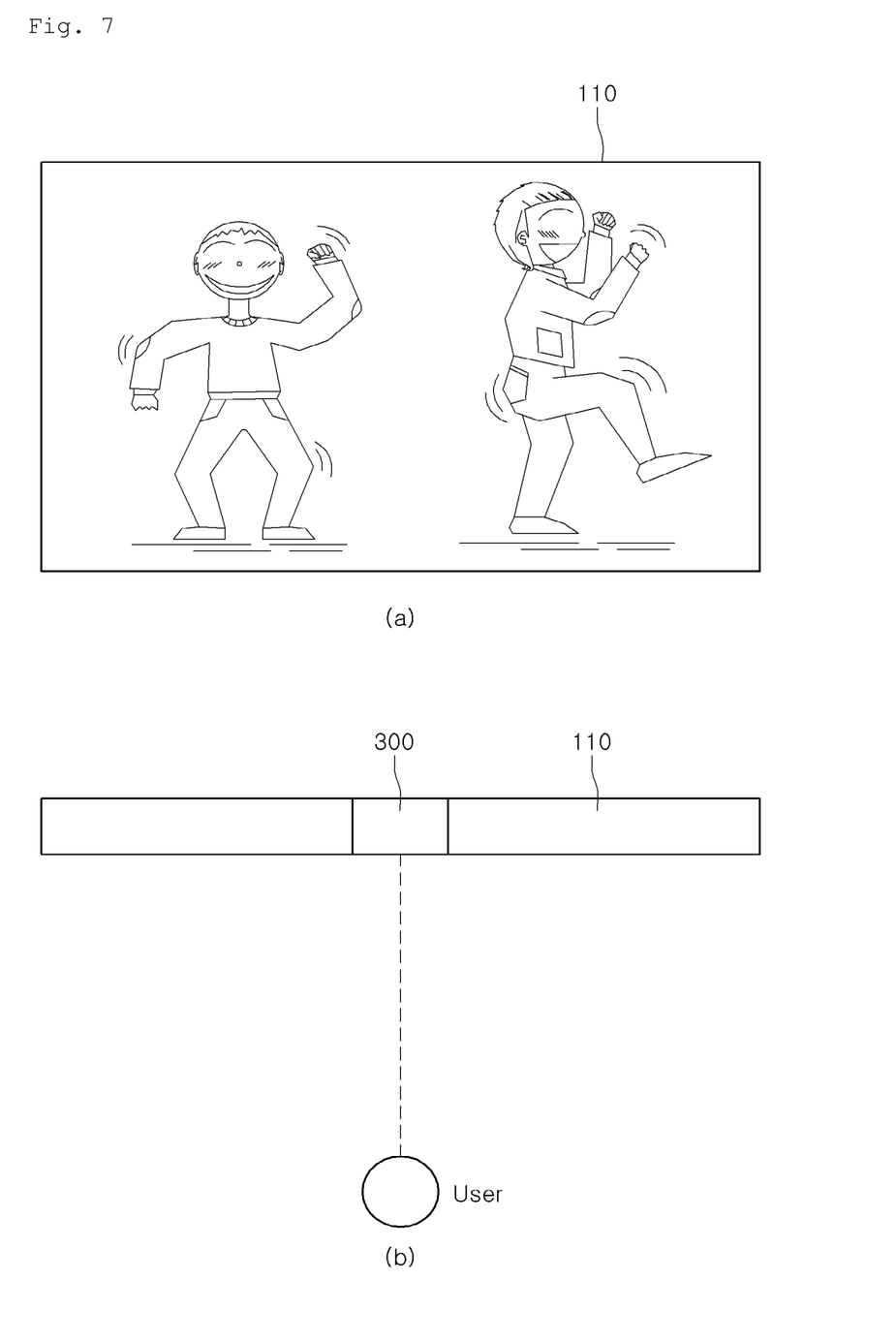
FIGS. 7 and 8 are views illustrating an example of changing an image configuration according to the distance from a user among user information.
Figure 8:
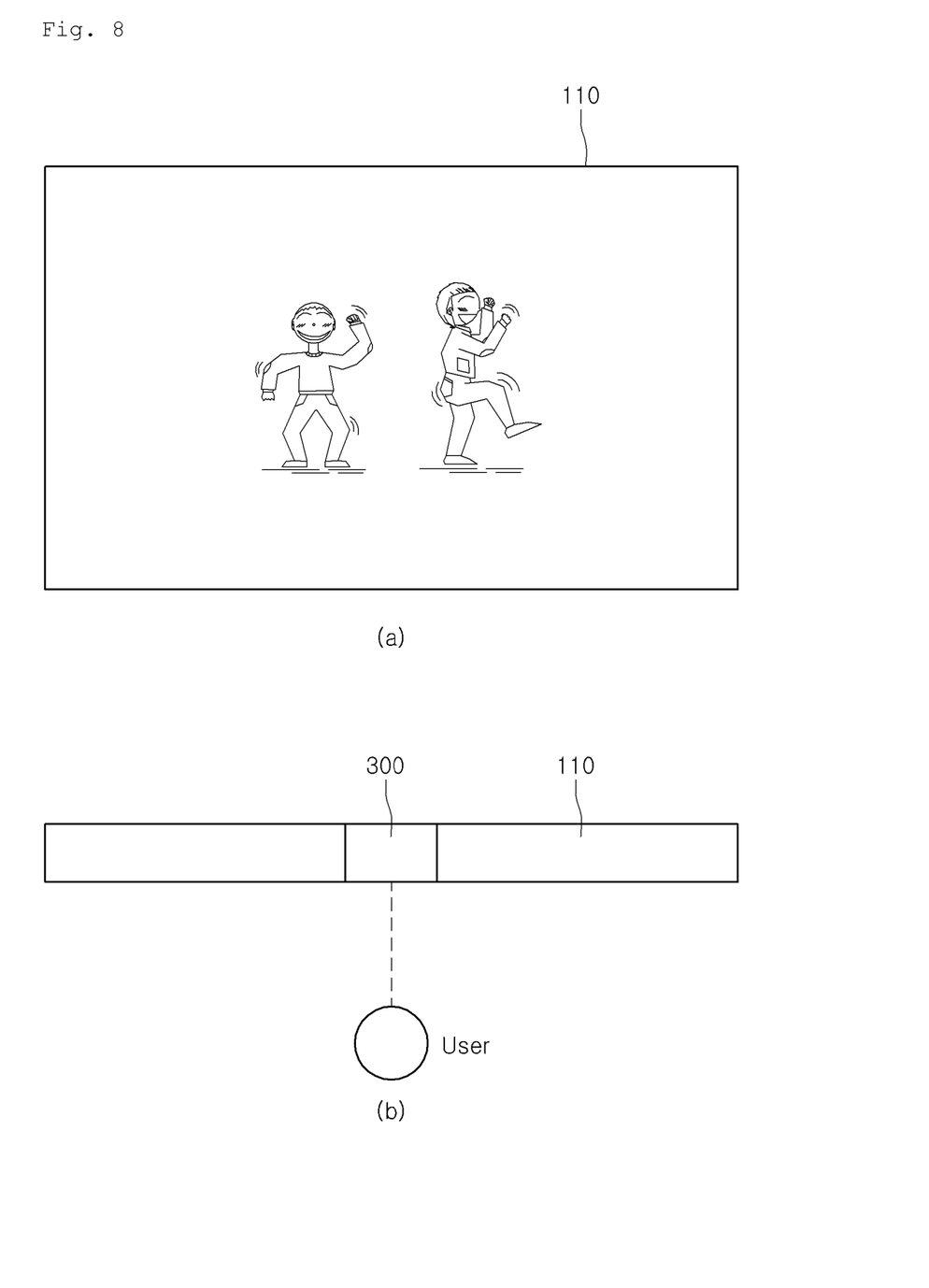

FIGS. 7 and 8 are views illustrating an example of changing an image configuration according to the distance from a user among user information.

The control unit 130 may change the size of an image using a distance from the display unit 110 to a user. As described in FIG. 7, when the control unit 130 determines that the distance from the user is relatively far from the user, for example, about 3 m, the control unit 130 may operate all of the sub display module to display an image on the whole of the display unit 110 for more comfortable viewing.

As described in FIG. 8, when the control unit 130 determines that the distance from the user is within about 3 m, the control unit 130 may control a smaller number of sub display modules to display the image in a smaller size.

In the adjustment of the image size according to the distance from a user, sub display modules to be selected may be determined according to the location of the user, using the user location information.

The adjustment of the image size has been described as part of the image configuration using the user information. In addition to the adjustment of the image size, the image configuration may include increasing or reducing the sharpness of objects in the displayed image. When a user is relatively close to the front side of the display unit, the sharpness may be reduced to mitigate the eyestrain. In addition to the sharpness, the brightness of the image may be adjusted, and the volume may be adjusted according to ambient noise. Also, the image may be rotated in a clockwise or counterclockwise direction by 90 degrees according to the posture of the user.

Figure 9:
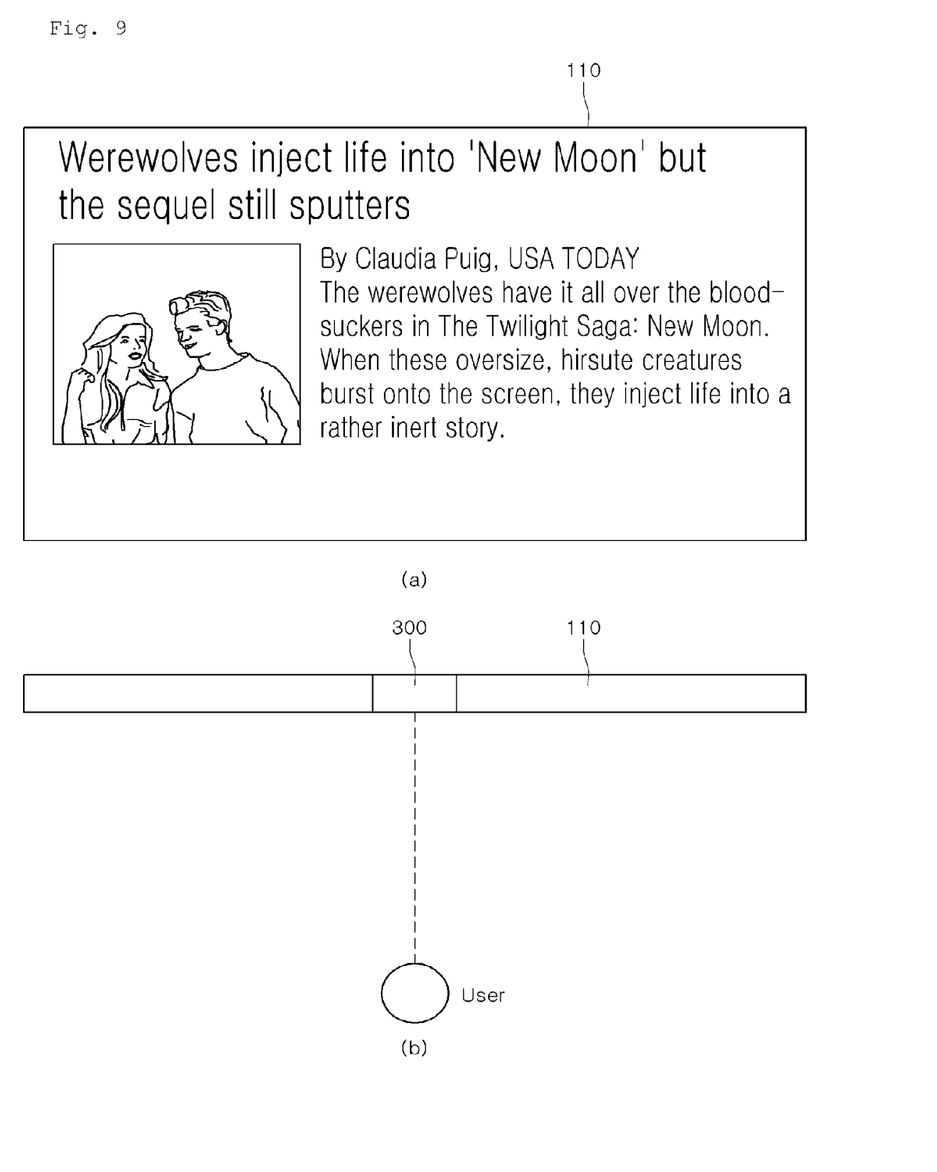
FIGS. 9 and 10 are views illustrating another example of changing an image configuration according to the distance from a user among user information.
Figure 10:
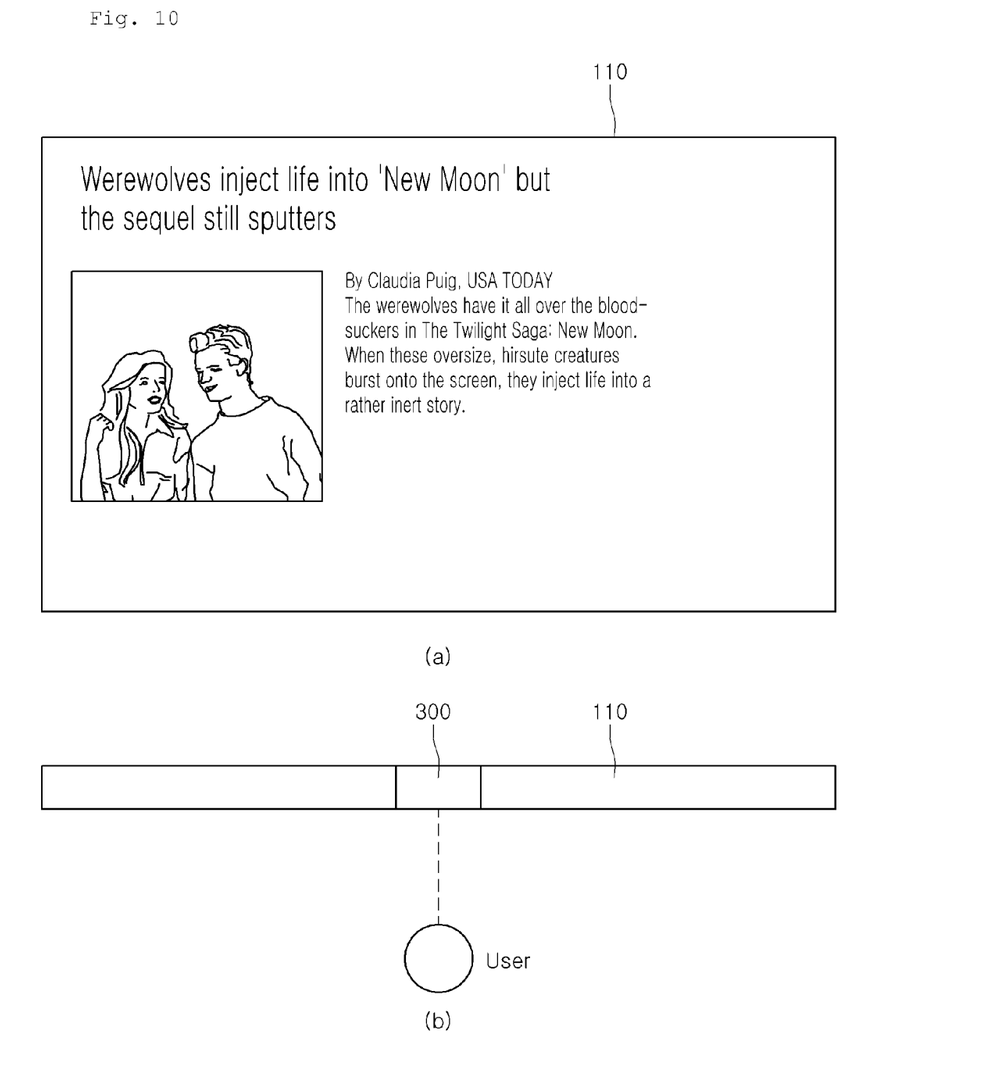

FIGS. 9 and 10 are views illustrating another example of changing an image configuration according to the distance from a user among user information.

During the image configuration, the control unit 130 may change the size of texts in an image, using a distance from the display unit 110 to a user. For example, as described in FIG. 9, when it is determined that the distance from a user is greater than about 3 m, in order for the user to easily read texts, the control unit 130 may operate all of the sub display modules to display the texts or an image including the texts on the whole of the display unit 110.

As a similar example shown in FIG. 10, when it is determined that the distance from a user falls within about 3 m, the control unit 130 may select a smaller number of sub display modules to display texts in a smaller size.

In the adjustment of the text size according to the distance from a user, sub display modules to be selected may be determined according to the location of the user, using the user location information.

Figure 11:
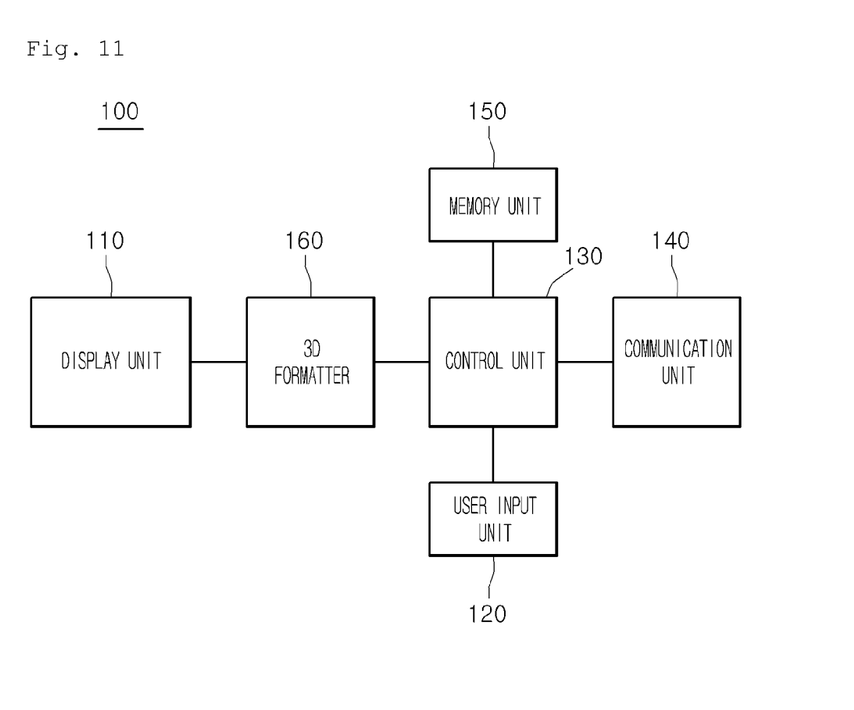
FIG. 11 is a schematic view illustrating the configuration of a user adaptive display unit according to another embodiment.

FIG. 11 is a schematic view illustrating the configuration of a user adaptive display unit according to another embodiment.

A display device 100 according to another embodiment may output a three-dimensional image. That is, the display device 100 may provide a three-dimensional image or menu screen. When a contents provider provides three-dimensional contents, the display unit 100 may output the three-dimensional contents through the communication unit 140.

An additional component may be required to output three-dimensional images. FIG. 11 illustrates the configuration of a display device that can process three-dimensional images, according to another embodiment. The functions of all components of FIG. 11 except a 3D formatter may be similar to those of FIG. 1.

As shown in FIG. 11, the 3D formatter 160 may be disposed at an output terminal of an image signal processing unit (not shown). That is, the 3D formatter 160 may be disposed at an input terminal of the display unit 110. The 3D formatter 160 may convert an image processed by the control unit 130 into a three-dimensional image, and may deliver the three-dimensional image to the display unit 110. According to embodiments, a separate 3D formatter may be provided to convert an OSD output of an OSD generation unit into a three-dimensional output.

The configuration shown in FIG. 11 is merely an example according to one embodiment, and therefore various known technologies may be employed for the 3D image processing.

The adjustment of the image configuration according to the user information as described above may also be performed on such a three-dimensional image. That is, the size of the three-dimensional image, the size of texts included in the three-dimensional image, and the depth of the three-dimensional image may be adjusted according to the user information.

For example, the control unit 130 may control the depth of the three-dimensional image to vary according to the distance from a user. In this case, the control unit may control the degree of projection feeling of a portion of the three-dimensional image, or may control an image region where the projection feeling is emphasized, to vary according to the location of the user.

When a user adaptive display device according to an embodiment of the present invention is used as a home display environment, a living room may be a common place shared by all family members, in which a user may be frequently changed. However, since the user profile and the user preference are continuously managed, various applications fit for users can be executed.

According to the embodiments of the present invention, the image quality can be automatically adjusted according to a user or a current state of the user without directly setting the size of an image and so forth by the user.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A user adaptive display device comprising:
   a display unit including a plurality of sub display modules connected to each other;
   a recognition unit installed on a portion of the display unit and configured to obtain data on a user located at a front of the display device;
   a control unit configured to:
   analyze the data on the user to generate a user information, the user information including at least one of an age of the user, a location of the user, a distance from the user and a gesture or voice of the user,
   adjust a number of sub display modules which are operated among the plurality of sub display modules to change a size of a display screen based on the user information, the sub display modules which are operated corresponding to the location of the user, and
   operate the adjusted sub display modules to display an image on the adjusted sub display modules.

2. The user adaptive display device according to claim 1, wherein the control unit changes a size of a text comprised in the image, or performs a conversion between a three-dimensional image and a two-dimensional image, according to the distance from the user.

3. The user adaptive display device according to claim 1, wherein the control unit performs an operation corresponding to the gesture or voice of the user.

4. The user adaptive display device according to claim 3, wherein the control unit rotates the display unit toward the user in response to the gesture or voice of the user.

5. The user adaptive display device according to claim 1, further comprising:
   a user input unit configured to receive an input command from the user; and
   a memory unit configured to store the user information and the image.

6. The user adaptive display device according to claim 1, further comprising a three-dimensional formatter configured to convert a two-dimensional image processed by the control unit into a three-dimensional image, wherein the control unit changes a depth of the three-dimensional image according to the user information.

7. The user adaptive display device according to claim 1, further comprising:
   a communication unit configured to connect the recognition device and configured to receive the data on the user from the recognition device or an external server.

8. The user adaptive display device according to claim 7, wherein the data on the user is transmitted from the recognition device to the external server.

9. A display method of a display device comprising a display unit including a plurality of sub display modules connected to each other, the method comprising:
   obtaining data on a user located at a front of the display unit through a recognition device;
   analyzing the data on the user to generate a user information, the user information including at least one of an age of the user, a location of the user, a distance from the user and a gesture or voice of the user;
   adjusting a number of sub display modules which are operated among the plurality of sub display modules to change a size of a display screen based on the user information, the sub display modules which are operated corresponding to the location of the user; and
   operating the adjusted sub display modules to display an image on the adjusted sub display modules.

10. The display method according to claim 9, further comprising:
    changing a size of a text in the image;
    changing a contour between objects in the image;
    rotating the display unit; or
    performing a conversion between a three-dimensional image and a two-dimensional image.

11. The display method according to claim 9, further comprising:
    converting a two-dimensional image processed by the control unit into a three-dimensional image, wherein a depth of the three-dimensional image is changed according to the user information.

* * * * *